US006808121B2

(12) United States Patent
Rice

(10) Patent No.: US 6,808,121 B2
(45) Date of Patent: Oct. 26, 2004

(54) FLUID PUMP

(76) Inventor: Charles J. Rice, 2123 Courtland Dr., Sanford, NC (US) 27331

(*) Notice: Subject to any disclaimer, the term of this patent is extended or adjusted under 35 U.S.C. 154(b) by 0 days.

(21) Appl. No.: 10/361,981

(22) Filed: Feb. 11, 2003

(65) Prior Publication Data

US 2004/0155118 A1 Aug. 12, 2004

(51) Int. Cl.[7] ........................ B05B 17/00; A01G 25/09; F01C 1/08; F03C 2/00

(52) U.S. Cl. ........................ 239/1; 239/146; 418/191

(58) Field of Search ........................ 237/1, 93, 159; 60/486; 418/191, 194

(56) References Cited

U.S. PATENT DOCUMENTS

| | | | | | |
|---|---|---|---|---|---|
| 1,404,200 | A | | 1/1922 | Grush | |
| 2,599,680 | A | | 6/1952 | Weeks | |
| 2,933,897 | A | * | 4/1960 | Toutant | 60/419 |
| 3,654,792 | A | * | 4/1972 | Mead | 72/391.8 |
| 3,817,665 | A | * | 6/1974 | Myers | 418/189 |
| 3,838,952 | A | * | 10/1974 | Futamata et al. | 418/126 |
| 4,373,669 | A | * | 2/1983 | Swanson | 239/124 |
| 4,400,147 | A | | 8/1983 | Springer et al. | |
| 4,534,717 | A | | 8/1985 | McCabe et al. | |
| 4,723,892 | A | | 2/1988 | Cowan | |
| 4,767,033 | A | | 8/1988 | Gemperle | |
| 5,004,159 | A | * | 4/1991 | Kistner | 239/337 |
| 5,097,595 | A | | 3/1992 | Suggs | |
| 5,388,761 | A | | 2/1995 | Langeman | |
| 5,547,128 | A | * | 8/1996 | Scheffler | 239/77 |
| 5,836,482 | A | | 11/1998 | Ophardt et al. | |
| 2003/0132310 | A1 | * | 7/2003 | Polk et al. | 239/159 |

* cited by examiner

*Primary Examiner*—William C. Doerrler
(74) *Attorney, Agent, or Firm*—Coats & Bennett, P.L.L.C.

(57) ABSTRACT

A fluid pump for pumping fluidized materials comprises a motor, a material pump, and a closed-loop pressure hydraulic system interconnecting the motor and the material pump. The closed-loop hydraulic system further comprises a hydraulic pump, a pressure regulator, an impeller, and an expandable fluid reservoir. The motor includes an output to drive the hydraulic pump, which pumps hydraulic fluid throughout the closed-loop hydraulic system. As the hydraulic fluid flows throughout the closed-loop system, it passes through the impeller, which in turn drives the material pump to deliver the fluidized material from a material reservoir to an outlet valve for dispensing the material.

28 Claims, 3 Drawing Sheets

FLUID PUMP

BACKGROUND OF THE INVENTION

The present invention relates generally to fluid pumps, and in particular, a fluid pump with a closed loop pressure regulation system for maintaining a constant pressure.

Pumps are often integral parts of tools utilized by both professionals and laymen alike to accomplish a given task more efficiently and professionally. One such example is the pump used in a paint sprayer. However, while easing the burden of the task, these tools also suffer at times from a number of distinct disadvantages. Among them is the fact that a motor directly drives the pump responsible for the application of a fluidized material under pressure.

Typically, actuating the motor between the "on" and "off" positions alternately engages and disengages a pump. When the motor is turned on, it may require some time before it can realize its full power. Unfortunately, the time it takes the motor to come to full power also affects the pressure level of the pump. That is, the pump may not reach its desired pressure level until after the motor reaches full power. Further, once the desired pressure level is reached, the pressure continues to build, thereby causing the fluidized material to drip. Not only does this result in the uneven application of the fluidized material, it generally creates a mess that needs to be cleaned. Thus, there remains a need for a pump that can maintain a substantially constant pressure.

SUMMARY OF THE INVENTION

One embodiment of the present invention comprises a multi-stage fluid pump having a closed-loop pressure regulation system interconnecting a motor and a material pump. The closed loop pressure regulation system comprises a pressure regulator, a hydraulic pump connected to and driven by the motor, and an impeller connected between the hydraulic pump and the material pump. The motor drives the hydraulic pump to circulate a fluid through the closed loop pressure regulation system at a substantially constant first pressure level. The closed loop system, in turn, drives the material pump to deliver a fluidized material at a substantially constant second pressure level from a material reservoir to a material dispenser. The first pressure level and the second pressure level are substantially equal.

The multi-stage fluid pump may be used to drive a paint sprayer, for example. The paint sprayer includes a pump that interconnects a paint reservoir and an outlet valve, a motor, a trigger mechanism operatively connected to the outlet valve, and a closed loop pressure regulation system interconnecting the motor and the pump. The motor drives the closed loop pressure regulation system to circulate a fluid through the closed loop system at a first pressure, which then drives the pump to deliver paint from the reservoir to the outlet valve at a second pressure level. As above, both the first and second pressures are generally constant and substantially equal.

DETAILED DESCRIPTION OF THE INVENTION

Figure 1:
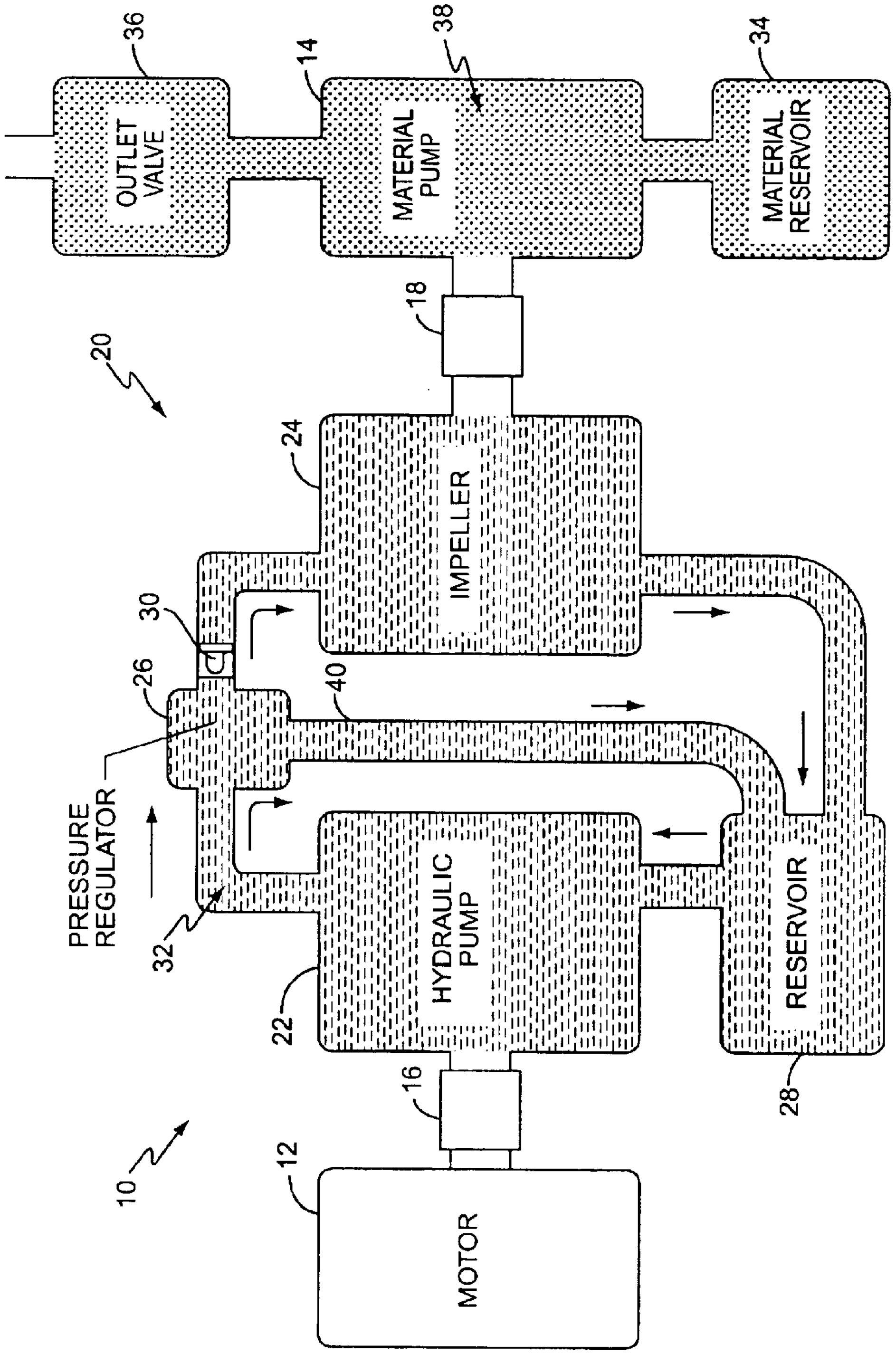
FIG. 1 is a schematic view of one embodiment of the present invention.

Referring now to FIG. 1, the multi-stage fluid pump is shown therein and is indicated generally by the number 10. The multi-stage fluid pump 10 comprises a motor 12, a material pump 14, and a closed loop pressure regulation system 20. The closed loop system 20 interconnects the motor 12 and material pump 14 via connections 16 and 18, respectively, and includes a hydraulic pump 22, an impeller 24, a pressure regulator 26, a fluid reservoir 28, and a bypass conduit 40. A fluid, such as hydraulic fluid 32, circulates throughout the closed loop system 20, while an optional valve 30 prevents any backflow of hydraulic fluid 32. The material pump 14, which interconnects a material reservoir 34 and an outlet valve 36, pumps a fluidized material 38 from the material reservoir 34 to the outlet valve 36.

The output of motor 12 connects to the input of the hydraulic pump 22 via connection 16, and drives hydraulic pump 22 to circulate hydraulic fluid 32 through the closed loop system 20 at a substantially constant first pressure level. To facilitate an understanding the invention, the motor 12 is described herein as an electric motor having an input (not shown) that connects to an electrical source (not shown), such as an electrical outlet. However, those skilled in the art will readily appreciate that other types of motors 12 may be used as well, for example, a gas powered motor.

The material pump 14 may be, for example, a hydraulic pump sufficient to draw the fluidized material 38 from the material reservoir 34, and deliver the fluidized material 38 to the outlet valve 36 at a substantially constant second pressure level that is substantially equal to the first pressure level. Material pump 14 includes an input that connects to the output of impeller 24 via connection 18. While impeller 24 is described later in more detail, it is sufficient for now to say that impeller 24 drives the material pump 14.

The connections 16,18 that interconnect the closed loop system 20 to the motor 12 and material pump 14, respectively, may be flexible or rigid, and are described herein as mechanical connections. As such, connections 16, 18 comprise gears, shafts, and other appropriate moving parts. Typically, connections 16, 18 are well known in the art, and are usually integrated with their component parts (i.e., motor 12, hydraulic pump 22, impeller 24, and material pump 14). As such, they will not be described in detail herein.

The hydraulic pump 22 circulates hydraulic fluid 32 throughout the closed loop system 20 at the constant first pressure level. As will be described later in more detail, a user may regulate the pressure at which the hydraulic fluid flows throughout the closed-loop system 20. In the embodiment shown in FIG. 1, the hydraulic fluid 32 enters the hydraulic pump 22 through an inlet, and exits through an outlet.

Those skilled in the art will readily appreciate that hydraulic pump 22 may be any type of pump that facilitates the circulation of pressurized hydraulic fluid 32. For example, hydraulic pump 22 may comprise gear pumps, rotary vein pumps, centrifugal pumps, or piston pumps. Further, hydraulic pump 22 may contain any number of inlets and outlets. That is, hydraulic fluid 32 may enter through a plurality of inlets, and exit through only one outlet. Alternatively, hydraulic fluid 32 may enter through a single inlet, and exit through a plurality of outlets. The number of inlets and outlets included in the hydraulic pump 22 is not important, however, it is preferred that hydraulic pump 22 is capable of circulating pressurized hydraulic fluid 32 through the closed loop system 20.

The pressure regulator 26 permits a user to regulate and adjust the first pressure level at which the hydraulic fluid 32 flows throughout the closed loop system 20. Like the hydraulic pump 22, pressure regulator 26 includes an inlet and an outlet to allow the flow of hydraulic fluid 32. The user adjusts pressure regulator 26 by turning a knob or activating another setting, for example, and sets the first pressure level of the hydraulic fluid 32 to any desired level. Although the user may regulate the first pressure level within the closed-loop system 20, the first pressure level of the hydraulic fluid 32 will remain substantially constant once set. This constant first pressure level provides a smoother application of fluidized material 38 by driving the material pump 38 to deliver the fluidized material at a constant second pressure level. This will be described later in more detail.

The hydraulic fluid reservoir 28 connects to the inlet of the hydraulic pump 22, and stores hydraulic fluid 32 that circulates throughout the closed loop system 20. Fluid reservoir 28 may be a cylinder with a movable piston, for example, or an expandable chamber that expands and contracts responsive to the user's adjustment of the first pressure level of the hydraulic fluid 32 using the pressure regulator 26. In one embodiment, fluid reservoir 28 is an expandable bladder. As the user decreases the first pressure level of the hydraulic fluid 32, the expandable bladder may expand, thereby providing a holding area for the hydraulic fluid 32. Conversely, as the user increases the first pressure level of the hydraulic fluid 32, the expandable bladder contracts as more hydraulic fluid 32 is allowed to pass through the closed-loop system 20 without collecting in the fluid reservoir 28. Thus, hydraulic fluid reservoir 28 acts as a capacitor, storing and releasing hydraulic fluid 32 responsive to adjustments in the first pressure level of the hydraulic fluid 32 as the user regulates the pressure. This provides hydraulic pump 22 with a steady supply of hydraulic fluid 32, and further, helps to ensure that air and/or other contaminants do not enter the closed loop system 20.

The bypass conduit 40 interconnects the pressure regulator 26 and the fluid reservoir 28, and permits the hydraulic fluid 32 flowing through the closed loop system 20 to travel an alternate path to the fluid reservoir 28 depending on the level of pressure. That is, any hydraulic fluid 32 that does not flow through optional needle valve 30, bypasses impeller 24 and returns to fluid reservoir 28 via bypass conduit 40. Thus, as the user adjusts the first pressure level using the pressure regulator 26, more or less hydraulic fluid 32 may flow through the needle valve 30 and into impeller 24. The bypass conduit 40 will handle any hydraulic fluid 32 not flowing through optional needle valve 30, and therefore, keep the first pressure level substantially constant. Of course, hydraulic fluid 32 exiting the outlet of impeller 24 also returns to the fluid reservoir 28.

The optional needle valve 30 keeps the flow of hydraulic fluid 32 flowing in one direction, and prevents any backflow of hydraulic fluid 32 through the closed loop system 22. While needle valve 30 is optional, it is preferably placed so that it lies between the pressure regulator 26 and before the inlet of impeller 24. In the embodiment shown in FIG. 1, the hydraulic fluid 32 flows in the direction indicated by the arrows. However, those skilled in the art will readily appreciate that the direction shown in FIG. 1 is merely illustrative, and hydraulic fluid 32 can actually flow in either direction.

The force of the hydraulic fluid 32 flowing through the closed loop system 20 drives the impeller 24. Like hydraulic pump 22, impeller 24 may comprise gear pumps, rotary vein pumps, centrifugal pumps, or piston pumps, and may contain any number of inlets and outlets through which the hydraulic fluid 32 flows. Impeller 24 further comprises at least one output that connects to the input of material pump 38 that drives material pump 38. Those skilled in the art will realize, however, that impeller 24 may comprise a plurality of outputs, wherein each output may connect to a different input. Accordingly, closed loop system 20 may be used to drive a plurality of material pumps 38. However, for illustrative purposes only, the embodiment of FIG. 1 shows the impeller 24 to include a single inlet, a single outlet, and a single output.

Figure 2:
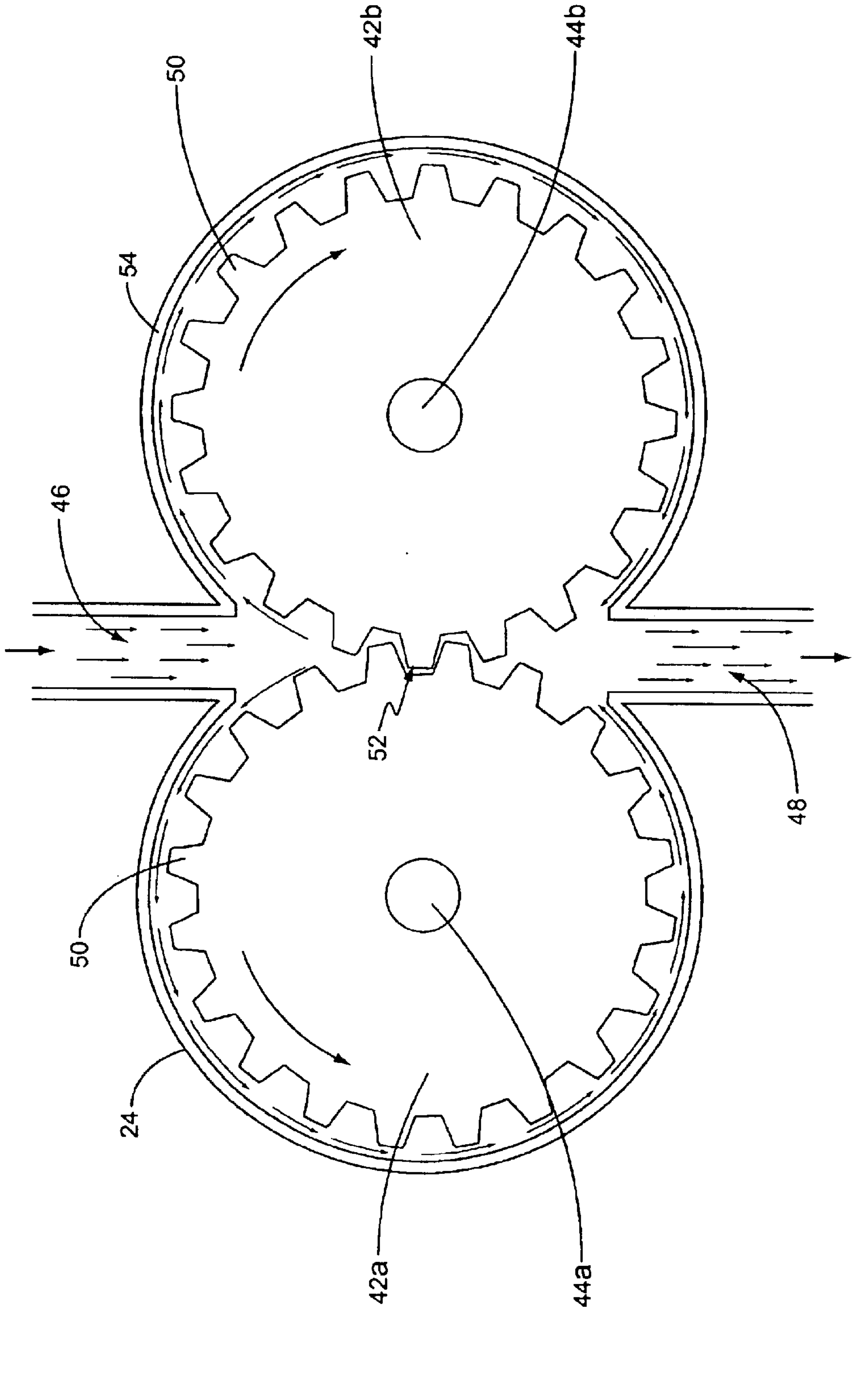
FIG. 2 is a perspective view of an exemplary impeller utilized in one embodiment of the present invention.

One exemplary impeller 24 used in one embodiment of the present invention is illustrated in more detail in FIG. 2 as a gear pump. Impeller 24 comprises a housing 54, and a pair of counter-rotating gears **42*a*, 42*b* having a plurality of intermeshing teeth 50. The counter rotating gears 42*a* and 42*b* rotate on a pair of spindles or shafts 44*a* and 44*b* respectively. The hydraulic fluid 32 enters the impeller housing 54 at the first pressure level through inlet 46, and is prohibited from flowing straight through impeller 24 by a barrier 52 formed by intermeshed teeth 50. The hydraulic fluid 32 is thus forced to flow between the inside of the impeller housing 54 and the counter-rotating gears 42*a*, 42*b***.

The pressurized hydraulic fluid 32 flowing around the outside of the counter-rotating gears **42*a*, 42*b* applies a pushing force to teeth 50, and causes counter rotating gears 42*a*, 42*b* to rotate in opposite directions. This rotation causes their respective shafts 44*a*, 44*b* to rotate as well, at least one of which is the output connected to the input of material pump 14. The hydraulic fluid 32 then exits impeller 24 through outlet 48, and returns to the fluid reservoir 28**.

Although FIG. 1 illustrates the components of the closed-loop system 20 in a certain order, those skilled in the art will readily appreciate that the components are not limited solely to interconnection in the manner shown in FIG. 1. However, the pressure regulator 26 is preferably connected between the hydraulic pump 22 and the inlet of impeller 24.

In operation, the motor 12 connects to the external power source, such as an electrical outlet, and is actuated between the "on" and "off" positions by a switch (not shown). The output of motor 12 connects to the input of hydraulic pump 22 via connection 16, and drives the hydraulic pump 22 to circulate the hydraulic fluid 32 throughout the closed loop system 20 at a substantially constant first pressure level. Using the pressure regulator 26, the user may regulate the first pressure level in the closed loop system 20. The fluid reservoir 28 stores and releases hydraulic fluid 32 accordingly as the user adjusts the first pressure level. The pressurized hydraulic fluid 32 flows through the impeller 24, and causes counter-rotating gears **42*a*, 42*b* to rotate on their respective shafts 44*a*, 44*b*. At least one of the shafts 44*a*, 44*b* is connected to the output of the impeller 24, which in turn, connects to the input of the material pump 14 via connection 18. As the counter-rotating gears 42*a*, 42*b* rotate, their respective shafts 44*a*, 44*b* also rotate, and thus, drive the material pump 14 to draw fluidized material 38 from material reservoir 34, and deliver it to the outlet valve 36** at a second pressure level.

The first pressure level and the second pressure level are substantially equal, and both the first and second pressure levels should remain substantially constant once the first pressure level is set by the user. This constant first pressure level keeps the second pressure level constant, and thus, it substantially negates the need to first build up either the first or second pressure levels. Thus, the dripping of fluidized material 32, as well as the uneven application of fluidized material 32, is substantially reduced.

Figure 3:
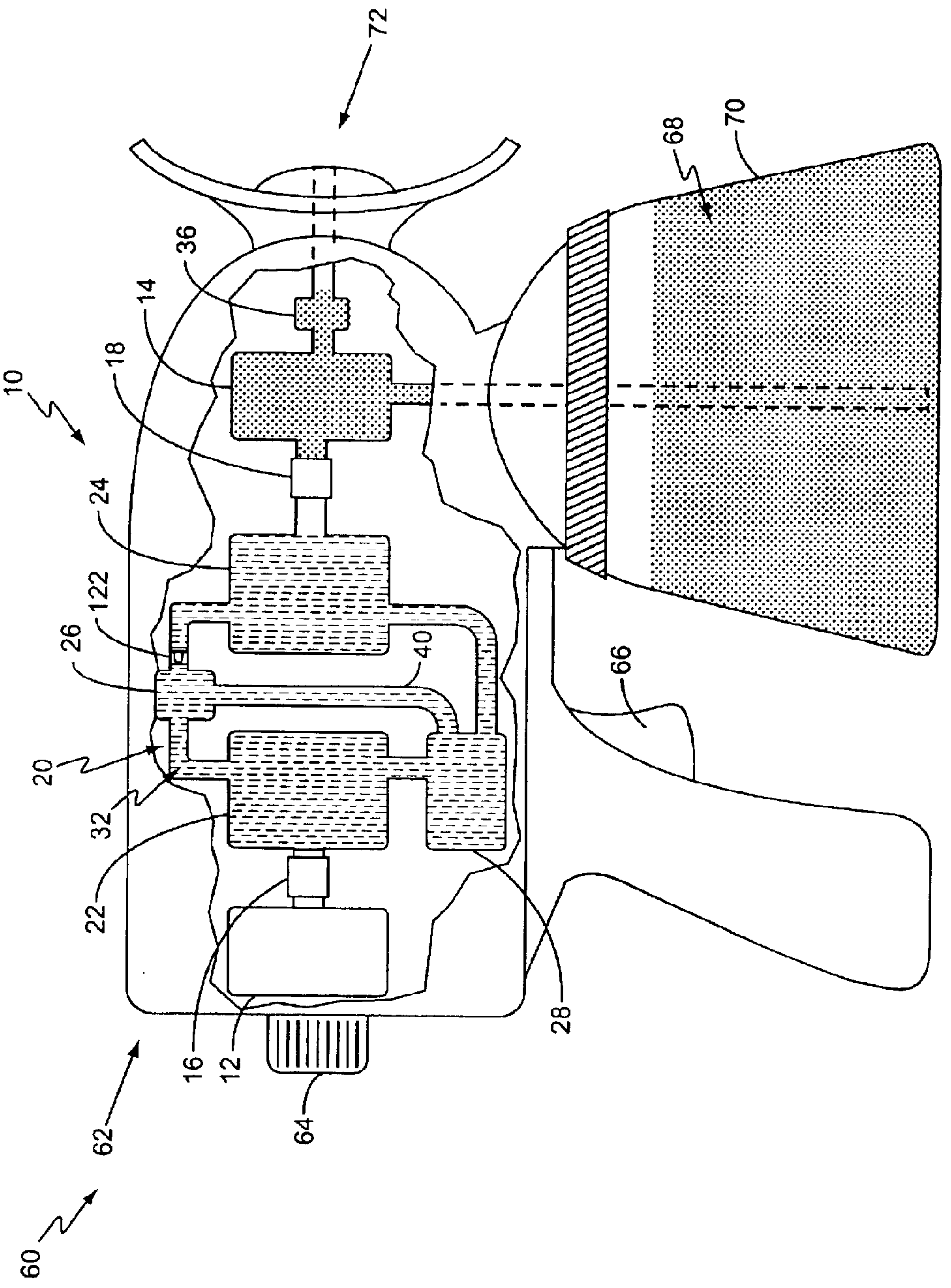
FIG. 3 is a cut-away view illustrating one embodiment of the present invention used in a paint sprayer.

FIG. 3 illustrates one embodiment of the multi-stage pump 10 used in a paint sprayer 60. Similar reference numbers have been used to indicate similar parts where possible.

Paint sprayer 60 houses the closed-loop pressure regulation system 20 that interconnects the motor 12 and the material pump 14. The user controls the first pressure level of the hydraulic fluid 32 via control 64, and actuates the paint sprayer 60 via trigger mechanism 66. The motor 12 drives the hydraulic pump 22 to circulate hydraulic fluid 32 throughout the closed loop system 20. The circulating hydraulic fluid 32 causes impeller 24 to drive material pump 14, which draws paint 68 from a paint reservoir 70, and delivers it to an applicator nozzle 72 through outlet valve 36. In this embodiment, the entire closed-loop system 20 fits securely within paint sprayer housing 62, although this is not required. In an alternate embodiment (not shown), closed-loop system 20 exists as a separate entity outside of the paint sprayer housing 62.

Depressing the trigger mechanism 66 opens the outlet valve 36, thereby permitting paint 68 to pass through to the applicator nozzle 72. Conversely, releasing the trigger mechanism 66 closes the outlet valve 36, thereby prohibiting paint 68 to pass through to the applicator nozzle 72. However, regardless of whether or not the user depresses or releases the trigger mechanism 66, motor 12 runs constantly. Thus, the hydraulic fluid 32 remains pressurized at a substantially constant first pressure level and constantly circulates throughout the closed loop system 20. As closed loop system 20 does not need to build up lost pressure each time the trigger mechanism is depressed by the user, the second pressure level remains substantially constant and generally equal to that of the first pressure level. Thus, paint 68 is delivered to the applicator 72 at a more or less constant second pressure level, which results in a more professional application.

While the fluidized material 38 is described herein as paint, those skilled in the art will readily appreciate that the fluidized material 38 may be any type of fluidized material, for example, grain, oil, or concrete. Further, the closed loop system 20 is not limited specifically to the use of hydraulic fluid 32 circulating at the first pressure level. In fact, the fluid that circulates may alternately be water, oil, or some other liquid.

Although the present invention has been described herein with respect to particular features, aspects, and embodiments thereof, it will be apparent that numerous variations, modifications, and other embodiments are possible within the broad scope of the present invention. The present embodiments are therefore to be construed in all aspects as illustrative and not restrictive, and all changes coming within the meaning and equivalency range of the appended claims are intended to be embraced therein.

What is claimed is:

1. A fluid pump comprising:

a motor;

a material pump interconnecting a material reservoir and a material dispenser; and a closed-loop pressure regulation system between said motor and said material pump comprising:

- a hydraulic pump connected to and driven by said motor;
- an impeller connected between said hydraulic pump and said material pump;
- a pressure regulator to regulate pressure in said closed-loop pressure regulation system; and
- an expandable hydraulic fluid reservoir.

2. The fluid pump of claim 1 wherein said hydraulic pump moves hydraulic fluid through said closed-loop pressure regulation system at a first pressure level.

3. The fluid pump of claim 1 wherein said impeller comprises a set of counter-rotating gears.

4. The fluid pump of claim 3 wherein said counter-rotating gears are rotated by said hydraulic fluid moving through said closed-loop pressure regulation system.

5. The fluid pump of claim 2 wherein said material pump delivers a fluidized material from said material reservoir to said material dispenser at a second pressure level.

6. The fluid pump of claim 5 wherein said first and second pressure levels are substantially constant.

7. The fluid pump of claim 6 wherein said second pressure level is substantially equal to said first pressure level.

8. The fluid pump of claim 2 further comprising a valve operatively connected to said impeller for preventing back-flow of said hydraulic fluid.

9. The fluid pump of claim 5 wherein said pressure regulator regulates said first pressure level of said hydraulic fluid in said closed-loop pressure regulation system.

10. The fluid pump of claim 9 wherein regulating said first pressure level regulates said second pressure level.

11. The fluid pump of claim 1 wherein said pressure regulator is positioned between an inlet of said impeller and said expandable hydraulic fluid reservoir.

12. The fluid pump of claim 1 wherein said pressure regulator includes a bypass connection operatively connected to said expandable hydraulic fluid reservoir.

13. A method of pumping a fluidized material, said method comprising:

interconnecting a motor and a material pump with a closed-loop pressure regulation system, said system comprising:

- a hydraulic pump;
- an impeller; and
- a pressure regulator;

circulating a fluid at a first pressure through said closed-loop pressure regulation system with said motor;

pumping a fluidized material at a second pressure from a material reservoir to a material dispenser by driving said material pump with said closed-loop pressure regulation system;

wherein said first pressure level and said second pressure level are substantially constant; and wherein said first pressure level regulates said second pressure level.

14. The method of claim 13 wherein interconnecting said motor and said material pump with said closed-loop pressure regulation system comprises connecting an output on said motor to a hydraulic pump, and connecting an output of said impeller to said material pump.

15. The method of claim 14 wherein circulating said fluid at said first pressure comprises driving said hydraulic pump with said motor output.

16. The method of claim 13 wherein circulating said fluid at said first pressure further comprises directing said fluid from said hydraulic pump to said impeller.

17. The method of claim 16 wherein circulating said fluid at said first pressure further comprises directing said fluid from said impeller into a fluid reservoir connected to said hydraulic pump.

18. The method of claim 13 wherein pumping said fluidized material comprises driving said material pump with said impeller, thereby causing said material pump to deliver said fluidized material from said material reservoir to said material dispenser.

19. The method of claim 13 further comprising regulating said first pressure with said pressure regulator.

20. The method of claim 13 wherein the first pressure level is substantially equal to the second pressure level.

21. A paint sprayer comprising:

a paint reservoir;

an outlet valve;

a motor;

a pump interconnecting said paint reservoir and said outlet valve;

a closed-loop pressure regulation system interconnecting said motor and said pump, wherein said motor drives fluid through said closed-loop pressure regulation system at a first pressure, and said closed-loop pressure regulation system drives said pump to deliver paint at a second pressure from said paint reservoir to said outlet valve;

wherein said first and second pressure levels are substantially constant; and wherein said first pressure level regulates said second pressure level.

22. The paint sprayer of claim 21 wherein said closed-loop pressure regulation system comprises a hydraulic pump connected to said motor.

23. The paint sprayer of claim 22 wherein said closed-loop pressure regulation system further comprises an impeller interconnecting said hydraulic pump and said pump.

24. The paint sprayer of claim 23 wherein said closed-loop pressure regulation system further comprises a pressure regulator.

25. The paint sprayer of claim 21 wherein said closed-loop pressure regulation system further comprises an expandable bladder reservoir.

26. The paint sprayer of claim 25 wherein said closed-loop pressure regulation system further comprises a bypass conduit interconnecting said pressure regulator and said expandable bladder reservoir.

27. A paint sprayer comprising:

a paint reservoir;

an outlet valve;

a motor;

a pump interconnecting said paint reservoir and said outlet valve;

a closed-loop pressure regulation system interconnecting said motor and said pump, and comprising an expandable hydraulic fluid reservoir, wherein said motor drives fluid through said closed-loop pressure regulation system at a first pressure, and said closed-loop pressure regulation system drives said pump to deliver paint at a second pressure from said paint reservoir to said outlet valve.

28. A paint sprayer comprising:

a housing;

a pump to deliver paint to an outlet valve;

a motor;

a closed-loop pressure regulation system interconnecting said motor and said pump, and having a fluid circulating at a first pressure to regulate the delivery of the paint by said pump at a second pressure; and said pump, said motor, and said closed-loop pressure regulation system being disposed within said housing.

* * * * *